Patented Feb. 12, 1946

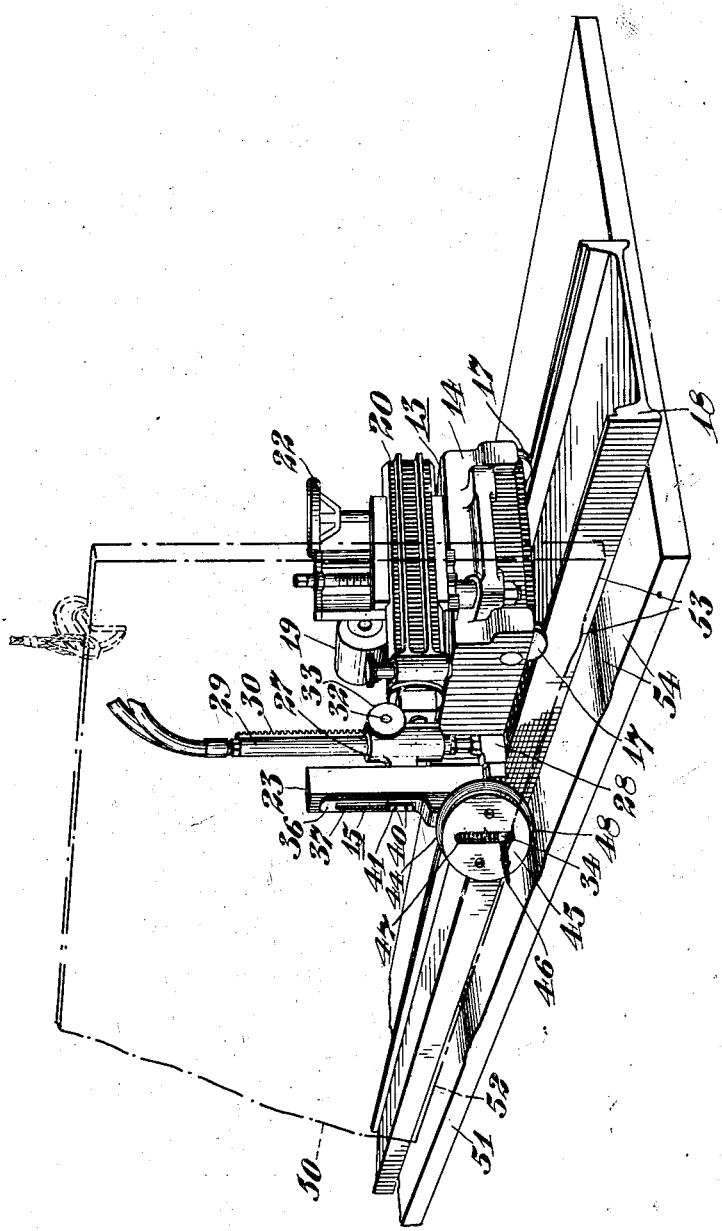

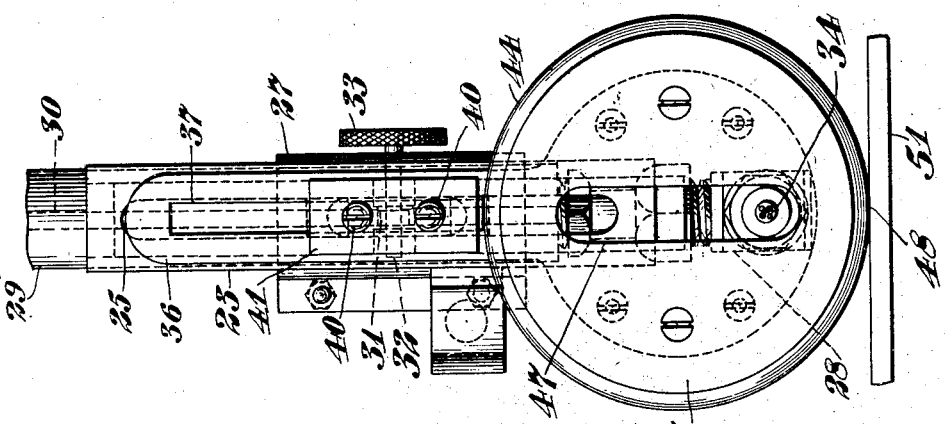

2,394,775

UNITED STATES PATENT OFFICE 2,394,775

METAL CUTTING APPARATUS

Gunnar Hans Hilstrom, East Weymouth, and William E. Westland, Quincy, Mass., assignors to Bethlehem Steel Company, a corporation of Pennsylvania Application January 22, 1943, Serial No. 473,190

10 Claims. (Cl. 266—23)

Our invention relates to supporting and guiding apparatus and more particularly to supporting and guiding apparatus for traveling torches.

Our invention is useful in connection with various types of self-propelled machine and especially self-propelled machines with traveling torches used for cutting and welding and is particularly adaptable where it is desired to cut a member of the same contour as the surface of the member to which it is to be attached, for instance, in ship construction where it is desired to cut members, such as bulkheads to fit the decks of ships, the surfaces of which are invariably of irregular contour, the decks being used as a support for the traveling torch during the cutting of the bulkheads.

One of the objects of our invention is to provide a self-propelled machine with a torch support having means adapted to travel on the surface of a member and support a torch at an angle to the surface of said member to accurately cut the edge of a member disposed perpendicular to the surface of the member upon which the torch support travels of the same contour as the surface of said member.

Another object of our invention is to provide a traveling torch with a traveling support which contacts the surface of the member upon which it travels directly beneath the torch so that the tip of the torch will travel in a line parallel to the surface upon which the torch support travels irrespective of the contour of said surface.

A further object of our invention is to provide a cutting machine with a traveling torch having a journalled support to contact the surface of a member with a centrally disposed slot through which the tip of the torch extends so that it is in alignment with the axis of the torch support and directly above the point of contact of the torch support with the surface of the member upon which it travels.

Figure 1 is a perspective view of a self-propelled machine incorporating our invention.

Fig. 2 is a side view of our improved torch supporting unit, partly in elevation and partly in section.

Fig. 3 is a sectional view taken on line 3—3 of Fig. 2.

Fig. 4 is an end view of the torch supporting unit.

Referring to the drawings, 13 designates a machine embodying our invention which comprises a portable self-propelled carriage 14 and a torch supporting unit 15. The carriage 14, which may be of any well-known construction, is shown with its wheels 17 mounted on a portable truck 18 and is propelled by the motor 19 through suitable gearing or other means operatively connecting the motor 19 in driving relation with one or more of the wheels 17. Extending from the carriage 14 is an arm 20 which is shown adjustably mounted thereon for horizontal movement through the medium of the hand wheel 22. Rigidly attached to the arm 20 is a bracket 23 having guideways 24 and 25 therein within which is slidably mounted our improved torch supporting unit 15 through the medium of the member 26. Attached to one side of the slidable member 26 is the torch holder 27, within which is adjustably mounted the torch 28. The torch 28 comprises a body 29, having a rack 30 thereon which meshes with the pinion 31 on the shaft 32 upon which is also mounted the operating wheel 33 so as to adjust the position of the torch 28 when it is so desired, and a tip 34 which is shown extending at right angles to the body of the torch 28. Attached to the opposite side of the slidable member 26 is the support 35 for supporting the torch holder unit 15. The support 35 comprises a bracket 36 having an elongated slot 37 in the upper end thereof through which the member 38 extends and to which the bracket 36 is adjustably fastened by means of the screws 40 and the plate 41. On the lower end of the bracket 36 is mounted a journal or bearing 42, and on the journal 42 is rotatably mounted the wheel 44. Bearings 43 are disposed intermediate the journal 42 and the wheel 44. A protector 45 of heat insulating material, such as asbestos board, is attached to the face of the journal 42 and extends over the face of the wheel 44 and shields the journal and the wheel from the heat from the torch flame 46. An elongated vertical slot 47 through which the torch tip 34 freely extends is provided in the lower end of the bracket 36, the journal 42 and the protecting shield 45 so that the torch tip 34 is correctly positioned directly over the point of contact of the wheel 44 with the surface upon which it travels as indicated at 48, Figure 1. This construction permits the torch tip 34 to be adjustably mounted in axial alignment with the point of contact of the wheel 44 with the surface upon which it travels so that the tip 34 may be correctly positioned to the required height from said surface by simply adjusting the torch 28 by rotation of the operating wheel 33.

In operation, when it is desired to cut one member, to fit another member, such as the bulkhead 50 to fit the deck 51, the tracks 18 are placed on the deck 51 and the carriage 14 is mounted on the tracks 18 with the torch supporting unit 15 positioned so that the wheel 44 will ride on the surface of the deck plate 51 along the line where it is desired to connect the bulkhead 50. The bulkhead 50 is shown supported at right angles to the deck plate 51 with its lower edge 52 spaced therefrom and with the torch 28 adjusted with its tip 34 correctly positioned with reference to the edge 52. The motor 19 is now started and the carriage 14 is propelled along the tracks 18 and the torch supporting unit 15 which is attached to the carriage 14 by means of the arm 20 will also travel therewith. As the torch supporting unit 15 is slidably mounted in the vertical guideways 24 and supported by the wheel 44 which travels on the surface of the plate 51 it will follow any irregularities in the surface of the plate and move the torch tip 34 up or down and cut the bulkhead 50 so that the lower edge of the cut surface 53 is of the same contour as the surface 54 of the plate 51 to which it is to be attached, as shown in Figure 1.

While we have shown our invention in but one form, it will be obvious to those skilled in the art that it is not so limited, but is susceptible of various changes and modifications without departing from the spirit thereof and we desire, therefore, that only such limitations shall be placed thereupon as are imposed by the prior art or as are specifically set forth in the appended claims.

Having thus described our invention what we claim as new and desire to secure by Letters Patent is:

1. A holder and support for a tool for a traveling machine, comprising a member adapted to be operatively connected to said machine and having a vertical guide thereon, a member mounted in slidable relation with said guide, a recessed journal having a rotatable surface engaging member mounted thereon operatively connected to the slidable member and a tool mounted on the slidable member with its tip extending axially through the recessed journal in a vertical plane which passes through the lowermost point of the surface engaging member.

2. In a cutting apparatus for cutting a member to the same contour as the surface of the member to which the cut member is to be mated comprising a carriage adapted to be propelled along a predetermined path, an arm projecting from the side of said carriage, a holder, means for mounting said holder to the arm of said carriage in vertical slidable relation therewith, a support for said holder adapted to travel on the surface of a member along the line at which the edge of the cut member is to be mated regardless of its contour, said support comprising a journal having a recess therein in vertical alignment with the axis of the support and means having a tip mounted in the holder with its tip extending axially through the recessed journal, said tip terminating in close proximity to the outer face of said journal and being disposed in a vertical plane which passes through the point of contact of the support with the surface upon which it travels.

3. In a cutting apparatus comprising a holder operatively connected to a movable carriage in freely vertically sliding relation therewith and having a support to engage the surface of a member, said support comprising a journal having a recess therein disposed in vertical alignment with its axis, and means having a tip mounted in said holder with its tip extending axially through the recessed support and terminating in close proximity to the outer face of said journal.

4. In a cutting apparatus comprising a holder operatively connected to a movable carriage and having a support to engage the surface of a member, said support comprising a journal having a recess therein disposed in vertical alignment with its axis, means having a tip mounted in said holder with its tip extending transversely through the recess in said support and terminating in close proximity to the outer face of said journal in the axial vertical plane thereof and heat insulating material disposed on the face of said journal adjacent said tip.

5. An apparatus for cutting a member with an edge of the same contour as the surface of a member to which said cut edge is to be mated, said apparatus comprising a travelling carriage, a bracket mounted on said carriage in vertical slidable relation therewith and adapted to travel with said carriage, an axially recessed journal mounted on said bracket, a rotatable member mounted on said journal and adapted to contact the surface of a member along the line at which the cut edge is to be mated regardless of the contour of said surface, means mounted on said slidable bracket and in predetermined relation with the journal having its tip extending axially through the recessed journal and terminating in close proximity to the outer side thereof, and during operation having its movement controlled along a line which when extended passes in close proximity to the point of contact between the rotatable member and the surface to be mated.

6. In a cutting machine, a travelling carriage having a supporting unit to travel on the surface of a member to which the member cut by said machine is to be mated, said supporting unit comprising a bracket mounted in vertically slidable relation to said carriage, a journal with an axially disposed recess therein mounted on said bracket and a surface engaging rotatable supporting member mounted on said journal, and means comprising a member mounted on said bracket in predetermined relation with the surface engaging member with the tip thereof extending transversely through said recessed journal, the outer end thereof terminating in close proximity to the outer face of said journal, said tip being disposed directly above the point of contact of the rotatable member with the surface to be mated when said member is in its operative position upon said surface.

7. In a cutting machine for cutting a member to the same contour as the surface of a member to which the edge of the cut member is to be mated, a travelling carriage having means for supporting it on a surface adjacent to the work to be cut, a cutting apparatus having a tip through which a cutting jet is directed against the work to be cut, a rotatable support for said apparatus adapted to travel upon the surface of the member along the line at which the cut edge of the work is to be mated, a journal for said rotatable support having an axial recess therein, said apparatus having its tip extending through said recess in the journal and terminating in close proximity to the outside thereof, means for mounting the journal and said cutting apparatus in predetermined relation to each other and in slidable relation with said carriage to permit vertical movement of the rotatable support and the said apparatus independently of the carriage and, in operation, to permit the rotatable support to follow the contour of the surface of the member upon which the rotatable support travels irrespective of the contour of the surface upon which the carriage travels, and the cutting jet from the tip of said apparatus to move in a line which when extended passes in close proximity to the point of contact between the rotatable member and the surface to be mated and to accurately cut the work opposite the point of contact of said rotatable member with said surface to the same contour as the surface upon which the rotatable support travels.

8. A travelling cutting apparatus for cutting a member with an edge of the same contour as the surface of a member to which said cut edge is to be mated comprising a bracket slidably attached to a travelling carriage, an axially recessed journal and cutting means mounted on said bracket, a rotatable surface engaging member mounted on said journal, said cutting means comprising a tip through which a cutting jet is directed against the work to be cut extending through the axial recess in the journal in axial alignment with the surface engaging portion of the rotatable surface engaging member and said tip terminating in close proximity to the outside of said journal whereby when the member to be cut is disposed in close proximity to the tip at an angle to the surface to be mated, the travel of the rotatable member upon the surface of said member along the line to be mated will cut the angularly disposed member of the same contour at corresponding points longitudinally thereof as the contour of the surface engaged by the rotatable member, thereby providing a cut edge of the same length and of the same contour as the surface to which it is to be mated.

9. A support for a tool comprising a bracket adapted to be attached to a travelling carriage in vertical slidable relation therewith, an axially recessed journal and a tool mounted on said bracket, a rotatable surface engaging member mounted on said journal, and said tool comprising a member extending through the recess in said journal in vertical axial alignment with the rotatable surface engaging member and adapted to be controlled in its vertical movement solely by the rotatable surface engaging member.

10. A support for a tool comprising a bracket adapted to be attached to a travelling carriage in vertical slidable relation therewith, a tool holder and a journal mounted on said bracket, a rotatable surface engaging member mounted on said journal, said journal having a recess therein in vertical alignment with the lowermost point of the rotatable surface engaging member adapted to receive the tip of a tool upon the mounting of a tool in said holder, the vertical movement of said holder relative to the carriage being controlled solely by the rotatable surface engaging member.

GUNNAR HANS HILSTROM.
WILLIAM E. WESTLAND.